Dec. 22, 1964   F. SCHREIBER ETAL   3,162,796
ELECTROMAGNETIC LINEAR MOTOR
Filed July 27, 1961   5 Sheets-Sheet 4

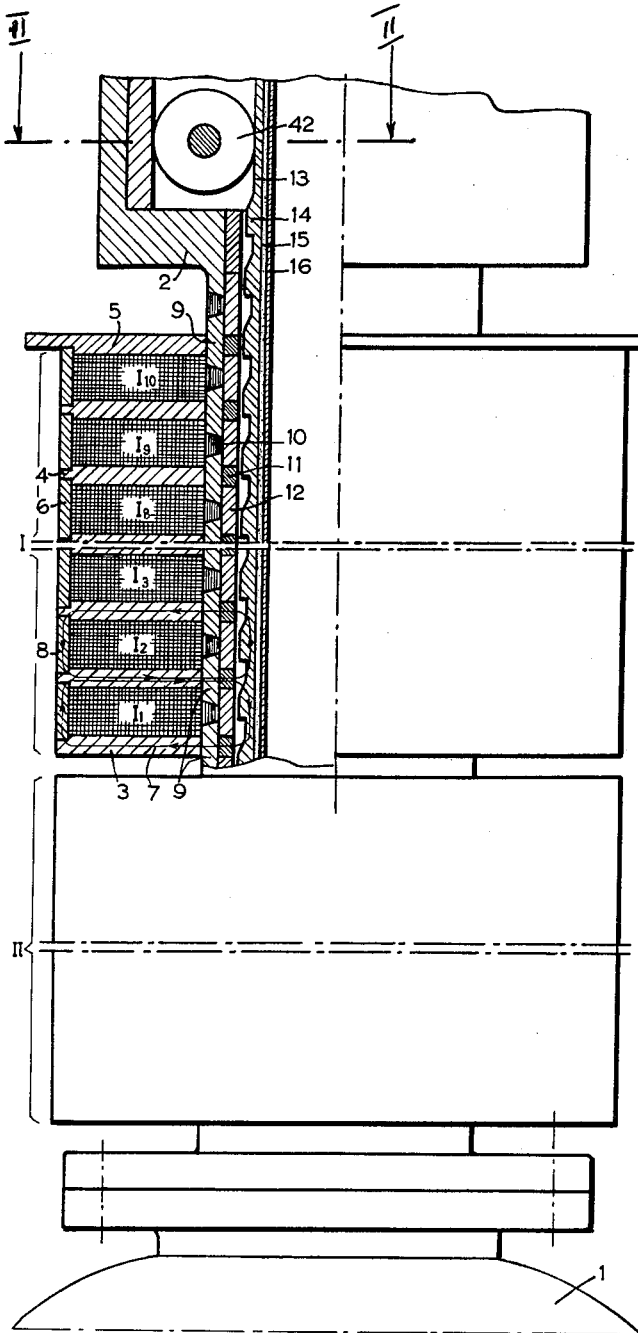
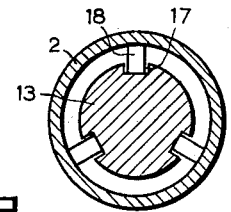
Fig.3
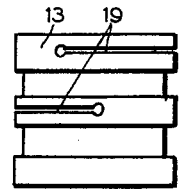
Fig.4
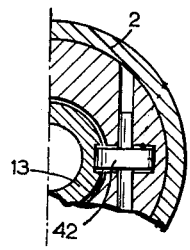
Fig. 2
Fig. 1

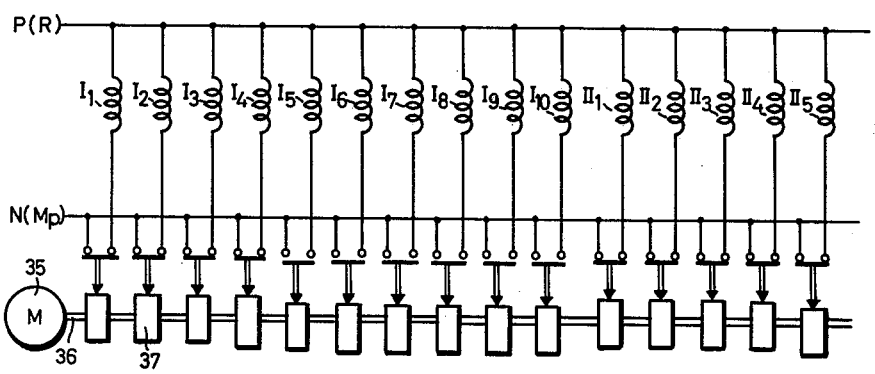
Fig. 20
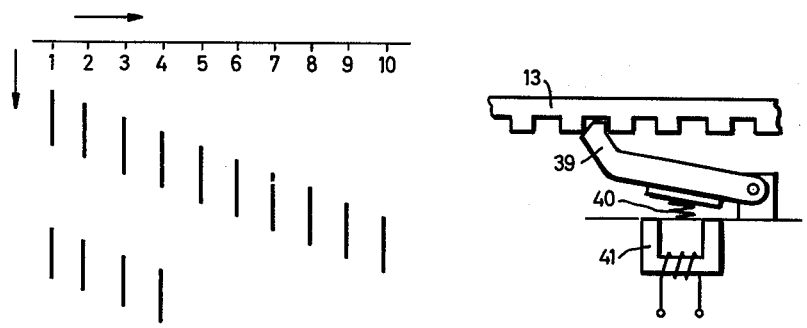
Fig. 22
Fig. 21

United States Patent Office 3,162,796
Patented Dec. 22, 1964

3,162,796
ELECTROMAGNETIC LINEAR MOTOR
Franz Schreiber and Hermann Kumpf, Erlangen, Germany, assignors to Siemens-Schuckertwerke Aktiengesellschaft, Berlin-Siemensstadt, Germany, a corporation of Germany
Filed July 27, 1961, Ser. No. 127,374
Claims priority, application Germany, Aug. 4, 1960,
S 69,776
17 Claims. (Cl. 318—135)

Our invention relates to linear motor and particularly to electromagnetic apparatus for imparting a longitudinal displacing motion to a rod-shaped structure within a tubular housing by means of magnetic force acting from the outside through the housing wall. Such apparatus are applicable, for example, in nuclear reactor plants for shifting the regulating and shut-off rods.

One apparatus of this type, called a "magnetic jack," comprises an electromagnetic holding coil, a lifting coil, a lowering coil and an auxiliary holding coil, all cooperating with an axially movable armature sleeve in the interior of the tubular housing. The armature sleeve surrounds a bunch of magnetizable and elastic rods with clearance. Proposals have been made to substitute the auxiliary holding coil by a second set of coils comprising another holding coil, lifting coil and lowering coil, and to substitute the bunch of rods by a single rod. With the aid of such devices, the rod-shaped structure can be moved incrementally at relatively slow speed.

It is an object of our invention to devise an electromagnetic apparatus generally of the above-mentioned type in which the rod-shaped structure to be axially displaced may have any desired cross section and can be moved virtually without impact forces and hence virtually free of frictional wear, at uniform and much greater speed than heretofore obtainable for practical operation.

According to our invention, these objectives are achieved by providing the rod-shaped structure with rack-like teeth in vernier relation to a number of magnet poles that are located on the outside of the housing to provide the magnetic fields for cooperation with the magnetizable rack teeth, so that the armature of the magnet is constituted by the tooth divisions. For uniformly moving the rod in a given direction, the respective excitation coils of the magnet poles are excited successively in a given sequence. This can be done for example by means of a programming switch such as a cam switch or drum switch, or also by means of a transistor switching circuit and the like.

According to further features of our invention, it is preferable, depending upon the weight of the structural part to be moved, to subdivide the excitation coils into a plurality of groups, and simultaneously to energize a plurality of excitation coils, for example four coils, in each group.

Since in a device embodying the invention, the rod-shaped structure is constituted by a series of magnetic armatures constituted by the rack teeth, the apparatus can comprise but a single movable part.

The invention will be further described with reference to the embodiments illustrated by way of example on the accompanying drawings in which:

FIG. 1 shows schematically a partial and partly sectional view of an apparatus according to the invention.

FIG. 2 is a cross section along the line II—II in FIG. 1.

FIG. 3 is a modified guiding structure shown applicable in lieu of the one shown in FIG. 2.

FIG. 4 shows part of a flexible rod structure applicable in lieu of the one shown in FIG. 1.

Figure 11:
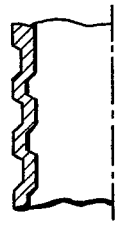

FIG. 11 exemplifies in section another design of the rack-type teeth.

Figure 12:
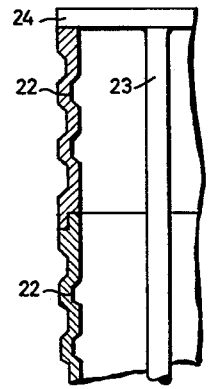

FIG. 12 shows in section a rod structure composed of tubular sections.

Figure 13:
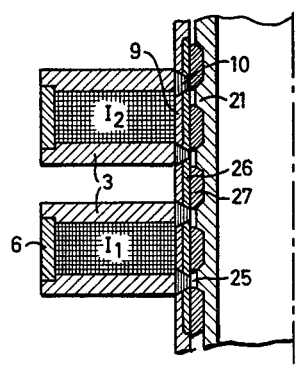

FIG. 13 shows in section another embodiment of the electromagnets.

Figure 15:
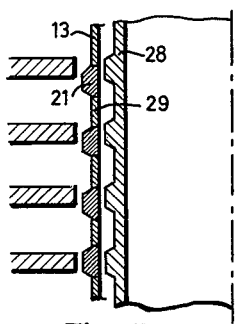
Figure 14:
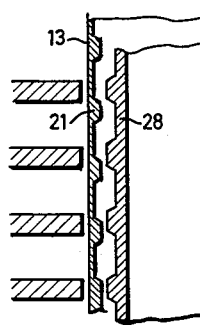

FIGS. 14 and 15 are sectional illustrations of two different embodiments respectively in which another rod provided with rack teeth, but stationary, is disposed in the interior of the tubular rod structure to be moved.

Figure 16:
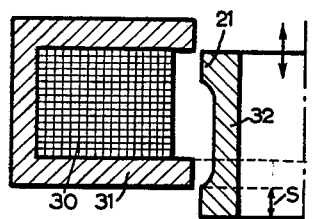
Figure 16A:
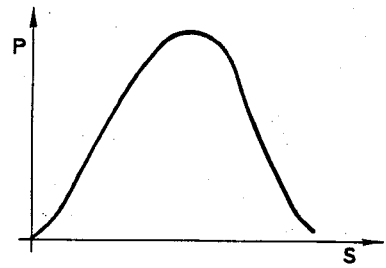
Figure 17:
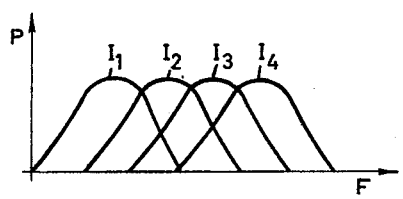
Figure 18:
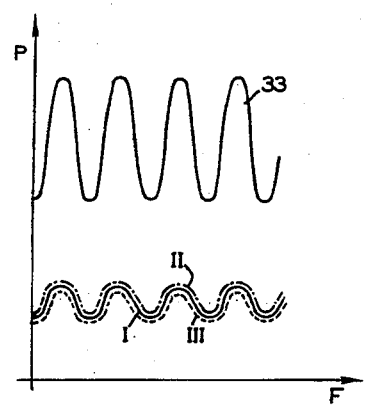
Figure 19:
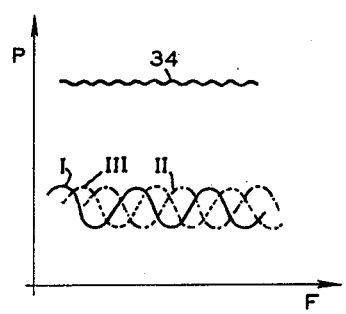

FIGS. 16 and 16a are explanatory and show a sectional view of a magnet and armature structure in correlation to a graph relating to the magnetic lifting forces;

FIGS. 17 18 and 19 are explanatory graphs.

FIG. 20 exemplifies an electric circuit diagram of a switching device for controlling a magnetic apparatus according to the invention.

FIG. 21 illustrates a latching device for cooperation with the rack teeth of the rod structure in apparatus according to the invention; and FIG. 22 is explanatory and represents a graph indicative of a switching program.

According to FIG. 1, a pressure tube 2 is flange-mounted on a vessel 1, such as the tank of a nuclear reactor, the tube 2 constituting the housing of the magnetic lifting and lowering apparatus for a tubular structure such as a tubular reaction control rod. Concentrically mounted on, and fastened to, the pressure tube 2 are a number of electromagnets comprising, for example, ten individual magnet coils $I_1$ to $I_{10}$ and the appertaining magnet-pole legs such as those denoted by 3, 4, 5, and ring-shaped magnetizable yokes such as the one denoted by 6. Each two adjacent coils are so electrically connected or wound that the magnetic fluxes in the common pole leg 4 have the same direction, this being indicated by arrowhead flux lines 7, 8. The pressure tube 2 consists of magnetizable, preferable ferritic material 9 into which non-magnetic, for example austenitic rings 10 are welded. Mounted in the interior of the pressure tube are alternating ring-shaped parts of magnetizable material 11 and of non-magnetic material 12 in such an arrangement that the magnetizable parts 11, together with the magnetizable ring portions 9 of the pressure tube, constitute pole-shoe extensions of the pole legs.

The parts 11, 12 make it possible to arrange the magnet poles with slight longitudinal tolerances irrespective of whether or not the pressure tube, composed of the rings 9 and 10, has become distorted, thus permitting adaptation of the magnet poles to the shape of the rod-shaped structure 13 located in the interior of the composite pressure tube. The parts 11, 12, preferably designed as full rings, are readily machinable on all sides. If desired, they may be slitted like piston rings or they may be entirely closed, depending upon requirements in each particular case.

The rod 13 consists essentially of magnetizable material and is provided with rack teeth 14 extending over substantially the entire periphery. The cross section of rod 13 preferably is ring-shaped, although it may also have other shapes such as the shape of any other hollow profile. For example, a rectangular shape, U-shape or double-T-shape are all permissible. Located in the interior of the hollow rod is a neutron-absorptive substance 15 consisting, for example, of silver-indium-cadmium or of boron. If desired, the neutron-absorber substance may be protected on the inner side by a steel sleeve as shown at 16. However, the absorber substance may also be located in the interspaces between the individual teeth of the rack teeth.

The number of saw teeth along the rack differs in vernier fashion from the number of the magnet poles. For example, 12 teeth may be provided for 11 magnet poles. When the excitation coils of the magnet poles are sequentially energized in continuous progression, a uniform pulling force becomes effective at the rack teeth, and the rod is uniformly moved in one and the same direction.

As indicated at coil $I_1$, the lines of force issuing, for example, from the lower pole leg 3 pass in a closed flux path through the adjacent yoke 6, the next upper pole leg 4, the parts 9 and 11 that form one pole shoe, and through one section or pair of rack teeth that constitutes an armature for the magnet and corresponds to the tooth division.

For increasing the pulling force further groups of electromagnets, each comprising ten magnets, may be provided, and the excitation coils of the individual groups can then be switched on and off in a uniform progressive sequence. It is of advantage to simultaneously switch on a plurality of excitation coils in each of these groups, for example four such coils. For proper switching of the coils, a program controller may be used such as the cam switch described below with reference to FIG. 20. The number of excitation coils and hence the number of teeth on the rack portion of the movable structure, as well as the number of the coil groups is essentially dependent upon the weight of the structure to be moved.

Located above and below the system of electromagnets are rollers 42 (FIGS. 1, 2) for properly guiding the rod structure. The rollers engage the rod structure 13 in longitudinal grooves which interrupt the rack teeth.

FIG. 3 shows a modification of the means for vertically guiding the displaceable rod structure. Guide rails 18 are provided on the inner wall of the pressure tube 2. The rails 18 engage respective grooves 17 of the rod structure 13. Such a design is particularly advantageous when the pressure tube has an inclined or horizontal position in which the tube may become bent and distorted. For permitting the rod structure 13 to follow such a bending deformation, it may be provided with slits 19 (FIG. 4) which are located on alternately opposite sides of the rod structure and extend perpendicularly to the rod axis. The grooves 17 (FIG. 3) in rod 13 may also be omitted.

Figure 6:
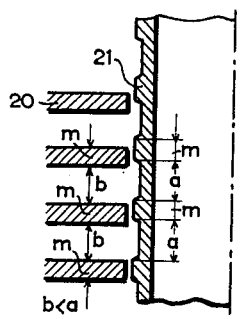

FIGS. 5 to 10 illustrate other possibilities of providing for a mutual displacement and vernier arrangement between the rack teeth and the magnet poles. In all cases the width $m$ of the transfer surfaces at the poles 20 and at the teeth 21 is the same, whereas the tooth division or pitch is different. For example, in FIG. 5 the spacing $a$ between the individual teeth is smaller than the distance $b$ between the magnet poles, this distance being available for accommodating an excitation coil. In FIG. 6 the spacing $a$ is larger than the distance $b$ so that according to FIG. 5, for example, five magnet poles correspond to six teeth, whereas according to FIG. 6 five teeth correspond to six magnet poles. According to FIG. 7 the division of the rack teeth is so chosen that $2a+m$ is smaller than $b$, whereas according to FIG. 8, $2a+m$ is larger than $b$. The displacements shown in FIGS. 9 and 10 correspond to those according to FIGS. 5 and 6 respectively, except that an interspace $c$ is provided between each two magnets. this interspace having the same magnitude as the spacing $a$ between two adjacent teeth. In lieu of the saw tooth configuration shown in FIG. 1, the embodiments of FIGS. 5 to 10 show teeth with substantially rectangular flanks.

The tooth configuration of FIG. 11 results in a uniform wall thickness of the rod and reduces the weight of the rod structure. Since in this case the rod must be machined from the inside, it is preferable to compose it of tubular portions 22 (FIG. 12) and to mount in the middle a holder rod 23 which holds the rod structure together, for example with the aid of end plates 24 that are welded to the respective ends of the central rod 23 and to the ends of the tubular portions 22.

Figure 5:
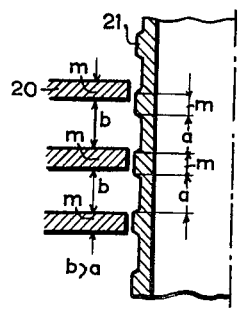
FIGS. 5 to 10 are schematic and sectional views showing vernier-type tooth divisions relative to appertaining magnet poles.
Figure 10:
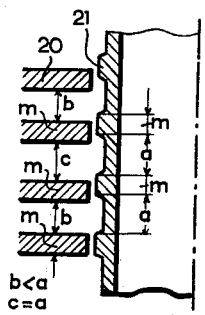
Figure 9:
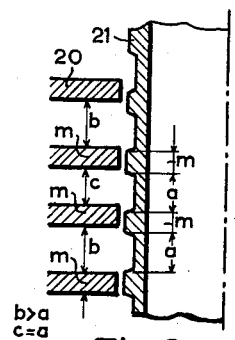
Figure 7:
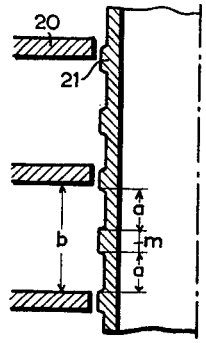
Figure 8:
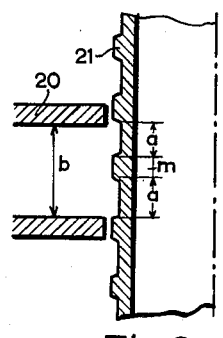

FIG. 13 illustrates an embodiment in which adjacent electromagnets are separated by an interspace in accordance with FIGS. 9 and 10. Further provided are rings 26, 27 of hard metal for guiding the rod structure. The transfer surfaces of the teeth 21 and of the pole shoes 9 are hardened, for example by being chromized or otherwise chromium coated, or nitrized.

According to FIGS. 14 and 15, another, but stationary rod 28 is mounted in the interior of the movable rod structure and carries rack teeth whose number is in accordance with the number of the magnet poles. This affords a further reduction in weight of the movable rod structure 13. In this case the magnetic flux path is closed through the teeth 21 of the movable rod 13 and through the teeth of the stationary rod 28. As shown in FIG. 15, the portions 29 located between the teeth 21 may then consist of non-magnetizable material, for example, austenitic boron steel, because they no longer form part of the magnetic flux path.

The graph in FIG. 16a represents the axial lifting force P in dependence upon the axial displacement S in the structure shown in FIG. 16. The lifting force P is the one imposed by the magnet poles 31 under the action of energized coil 30 upon the pair of teeth 21 that form part of the rod portion 32 and act as an armature for the magnet of coil 30. The maximum of axial force P is attained in the illustrated position of the armature 32. The axial force P is virtually equal to zero when the transfer surfaces of the teeth 21 and those of the poles are accurately located opposite each other. Since the excitation coils of the magnet poles are continuously switched in sequence, there occurs a resultant lifting force, acting upon the total rack teeth of the rod structure, as shown in FIG. 17. That is, the graph in FIG. 17 represents the lifting force P in dependence upon the switching sequence F. When several coil groups of uniformly progressing switching sequence are provided, the lifting forces of the individual groups of coils act additively and result, for example, in the individual forces represented by curves $I_1$, $I_2$, $I_3$, $I_4$ in FIG. 17, the resultant force being represented by curve 33 in FIG. 18. If the groups of coils I, II, III, are separated from each other by interspaces, the lifting forces can be made to become superimposed upon each other as is shown in FIG. 19. By virtue of such superposition, a nearly uniform time curve of the lifting force, as shown at 34 in FIG. 19, will result. Such a superposition, however, is also obtained if one coil, preferably the first coil, of the second, third, etc. group is slightly wider, for example 1 mm. wider, than the other coils of the groups.

The cam-type control device for the progressive excitation of the magnet coils shown in FIG. 20 is provided with an electric motor 35 which drives a cam shaft 36 with a separate cam 37 for each of the respective excitation coils. In the illustrated embodiment the cams are so set that in each group of coils four of them are simultaneously energized. The same switching sequence is repeated for the coils of the other groups, this being shown in FIG. 20 for the coils $II_1$ to $II_5$. When the coil $I_5$ is switched on, the coils $II_5$, $III_5$, are switched on simultaneously and the coils $I_1$, $II_1$, $III_1$ etc., are switched off.

Under some conditions, such as for nuclear reactors aboard ship, it may be necessary to reliably arrest the rod structure in a given position. A latching device as illustrated in FIG. 21 is applicable for such purposes. A latch pawl 39 engages the teeth of the rod structure 13 so that the rod cannot move in a given direction of an axial force, such as gravity or spring force, whereas axial force acting upon the rod in the opposite direction will release the pawl 39 from tooth to tooth. The pawl 39 is pressed into the tooth gap by a spring 40. The force of spring 40 can be eliminated by means of an electromagnet 41. The latching device may also be so chosen that the pawl is placed into engagement by an electromagnet and is released by a spring.

FIG. 22 shows an example of a switching program for a lifting operation. Indicated in the vertical direction is the switching-on duration of the coils whereas the horizontal reference axis indicates the coils by respective numbers. As shown, four coils of a group are energized simultaneously. For lowering operation, the coils are switched on and off in the reverse sequence, for example, commencing with coil 10.

It will be obvious to those skilled in the art, upon studying this disclosure, that our invention affords of a great variety of modifications with respect to details and hence may be given embodiments other than particularly illustrated and described herein, without departing from the essential features of our invention and within the scope of the claims annexed hereto.

We claim:

1. Electromagnetic apparatus for moving a rod structure within a housing by magnetic force applied from the outside, comprising a tubular housing and a rod structure longitudinally displaceable therein, a number of electromagnets adjacent to each other along said housing at the outside thereof and having magnet poles of alternately different polarity following each other at substantially uniform distances at said housing, said rod structure forming a longitudinal rack of teeth consisting of magnetizable material and located near said magnet poles so that respective rack portions form armatures for said respective magnets, the number of said teeth along a given length of said rack being different from the number of poles along said same length other than by an integral ratio and in accordance with a given vernier ratio, whereby sequential energization of said magnets causes progressive displacement of said rod structure.

2. Electromagnetic apparatus according to claim 1, comprising electric current supply means, and a sequential control device having respective switch means electrically connecting said respective electromagnets to said current supply means and having a given time sequence of connection with overlapping connecting periods of each two successively energized magnets, so that a plurality of said magnets are energized at any time during progressive displacement of said structure.

3. In electromagnetic apparatus according to claim 1, said number of electromagnets comprising a plurality of groups, current supply means, and sequential switching means electrically connecting said supply means with said magnet groups for simultaneously energizing respective magnets in said groups in the same progressive switching sequence.

4. In electromagnetic apparatus according to claim 1, said number of electromagnets comprising a plurality of groups, current supply means, and a sequential control device having respective switch means electrically connecting said respective electromagnets of each group to said current supply means and having a given time sequence of connection with overlapping connecting periods of each two successively energized magnets, so that a given plurality of said magnets in each group are energized at any time during progressive displacement of said structure.

5. Electromagnetic apparatus according to claim 1, comprising latching means having a pawl member engageable with said rack teeth for latching them in position, and electromagnetic means for releasing said pawl member from said teeth.

6. In electromagnetic apparatus according to claim 1, said tubular housing having a portion near said magnets composed of magnetizable ring members and non-magnetic ring members alternating with each other in the axial direction of the housing, said magnetizable ring members being located at said respective magnet poles to be traversed by magnetic flux issuing therefrom.

7. In electromagnetic apparatus according to claim 1, said tubular housing having a portion near said magnets composed of magnetizable ring members and non-magnetic ring members alternating with each other along said housing, and magnetizable inserts and non-magnetic inserts inserted into said housing adjacent to said rod structure and alternating with each other along asid housing, said magnetizable ring members and said respective magnetizable inserts being located adjacent to each other at said respective poles to be traversed by magnetic flux passing from said poles to said rack teeth.

8. Electromagnetic apparatus according to claim 1, comprising guide members mounted in said housing and in engagement with said rod structure to guide it for longitudinal motion.

9. Electromagnetic apparatus for moving a rod structure within a housing by magnetic force applied from the outside, comprising a tubular housing and a rod structure longitudinally displaceable therein, a number of electromagnets adjacent to each other along said housing at the outside thereof and having ring-shaped magnet pole pieces of alternately different magnetic polarities along said housing, said pole pieces surrounding said housing coaxially and forming respective annular pole faces in engagement with said housing, said rod structure forming a longitudinal rack of teeth consisting of magnetizable material and located near said pole faces so that respective rack portions form armatures for said respective magnets, said rack teeth extending about substantially the entire perimeter of said rack structure, and the number of said teeth along a given length of said rack being different from the number of poles along said same length other than by an integral ratio and in accordance with a given vernier ratio, whereby sequential energization of said magnets causes progressive displacement of said rod structure.

10. Electromagnetic apparatus according to claim 9, comprising guide rollers journalled in said housing, said rod structure having longitudinal glide faces interrupting said teeth and engaged by said rollers to guide said rod structure for longitudinal motion.

11. Electromagnetic apparatus for moving a rod structure within a housing by magnetic force applied from the outside, comprising a tubular housing and a tubular rod structure longitudinally and coaxially displaceable in said housing, a number of electromagnets adjacent to each other along said housing at the outside thereof and having ring-shaped magnet pole pieces of alternately different magnetic polarities along said housing, said pole pieces surrounding said housing coaxially and forming respectve annular pole faces in engagement with said housing, said tubular rod structure forming a longitudinal rack of teeth consisting of magnetizable material and located near said pole faces so that respective rack portions form apertures for said respective magnets, said rack teeth extending about substantially the entire perimeter of said rack structure, and the number of said teeth along a given length of said rack being different from the number of poles along said same length other than by an integral ratio and in accordance with a given vernier ratio.

12. In electromagnetic apparatus according to claim 11, said tubular rod structure comprising a plurality of tubular portions coaxially aligned and joined with each other.

13. In electromagnetic apparatus according to claim 11, said tubular rod structure having slits extending transversely from opposite sides through part of the width of the tubular rod structure and being longitudinally spaced from each other, whereby the rod structure can adapt itself to bending deformation of said housing.

14. Electromagnetic apparatus according to claim 1, comprising a neutron absorptive substance within said rod structure.

15. Electromagnetic apparatus according to claim 11, comprising a stationary rod mounted within said tubular rod structure and having magnetizable rack teeth whose number along said given length is equal to that of said magnet pole faces.

16. In electromagnetic apparatus according to claim 11, said displaceable tubular rod structure being composed of magnetizable and non-magnetic ring portions alternating with each other along said tubular rod structure with said rack teeth formed by said magnetizable ring portions and each of said non-magnetic portions located between each two of said magnetizable ring portions, and a fixed rod structure coaxially mounted inside said tubular rod structure and having magnetizable rack teeth which are directed toward said magnet pole faces and whose number along said given length is equal to that of said magnet pole faces.

17. Electromagnetic apparatus for moving a structure relative to a housing, comprising two relatively movable structures one of which forms a housing for the other, a plurality of electromagnets adjacent each other in one of said structures and having magnet poles of alternately different polarity following each other at substantially uniform distances, the other of said structures forming a plurality of adjacent teeth consisting of magnetizable material and located near said magnetic poles so that respective portions of said other structure form armatures for said respective magnets, the number of said teeth along a given portion of said other structure being different from the number of poles along that portion by other than an integral ratio and in accordance with a given vernier ratio, whereby sequential energization of said magnets causes progressive relative displacement of said structures.

References Cited by the Examiner
UNITED STATES PATENTS

| | | | |
|---|---|---|---|
| 2,803,761 | 8/57 | Young | 310—14 |
| 2,831,990 | 4/58 | Young | 310—14 |
| 2,915,654 | 12/59 | Robinson | 310—14 |
| 2,964,498 | 7/60 | Dean | 310—12 |

FOREIGN PATENTS

| | | |
|---|---|---|
| 821,164 | 9/59 | Great Britain. |
| 857,059 | 12/60 | Great Britain. |

OTHER REFERENCES

Schultz: Control of Nuclear Reactors and Power Plants, 1st edition, 1955, pages 108–110 and 114.

MILTON O. HIRSHFIELD, *Primary Examiner.*
REUBEN EPSTEIN, *Examiner.*